US010976855B1

(12) United States Patent
Nicoli

(10) Patent No.: US 10,976,855 B1
(45) Date of Patent: Apr. 13, 2021

(54) FLEXIBLE TOUCH SENSING ASSEMBLY FOR DETECTING PROXIMITY OF USER TO A CONTROLLER DEVICE

(71) Applicant: Facebook Technologies, LLC, Menlo Park, CA (US)

(72) Inventor: Raymond Louis Nicoli, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 184 days.

(21) Appl. No.: 16/020,870

(22) Filed: Jun. 27, 2018

(51) Int. Cl.
*G06F 3/041* (2006.01)
*G06F 3/044* (2006.01)
*G06F 3/045* (2006.01)

(52) U.S. Cl.
CPC ............ *G06F 3/0416* (2013.01); *G06F 3/044* (2013.01); *G06F 3/045* (2013.01); *G06F 2203/04101* (2013.01); *G06F 2203/04102* (2013.01); *G06F 2203/04104* (2013.01); *G06F 2203/04105* (2013.01); *G06F 2203/04106* (2013.01)

(58) Field of Classification Search
CPC ........ G06F 3/0416; G06F 3/044; G06F 3/045; G06F 2203/04101; G06F 2203/04102; G06F 2203/04104; G06F 2203/04105; G06F 2203/04106
See application file for complete search history.

(56) References Cited

U.S. PATENT DOCUMENTS

| 6,492,979 | B1 * | 12/2002 | Kent | G06F 3/0414 178/18.01 |
| 8,269,112 | B2 * | 9/2012 | Lee | H05K 3/222 174/254 |
| 8,669,963 | B2 * | 3/2014 | Baker | G06F 3/0446 345/174 |
| 10,228,806 | B2 * | 3/2019 | Tomita | G06F 3/045 |
| 10,852,913 | B2 * | 12/2020 | Yoganandan | G06F 3/0428 |
| 2008/0231605 | A1 * | 9/2008 | Yang | G06F 3/044 345/173 |
| 2009/0058829 | A1 * | 3/2009 | Kim | G06F 3/016 345/173 |
| 2011/0005845 | A1 * | 1/2011 | Hotelling | G06F 3/0443 178/18.06 |
| 2011/0050629 | A1 * | 3/2011 | Homma | G06F 3/0488 345/174 |
| 2011/0275317 | A1 * | 11/2011 | Ryu | H04M 1/2757 455/41.1 |
| 2012/0032916 | A1 * | 2/2012 | Enoki | G06F 3/044 345/174 |
| 2012/0268422 | A1 * | 10/2012 | Hirakawa | G06F 1/3203 345/174 |

(Continued)

*Primary Examiner* — Antonio Xavier
(74) *Attorney, Agent, or Firm* — Fenwick & West LLP

(57) ABSTRACT

A touch sensing assembly includes a touch sensing layer that is configured to couple to an interface. The interface is configured to receive contact with skin of a user on a first surface. A first touch sensing layer is coupled to interface. The first touch sensing layer includes a plurality of touch sensors and a plurality of electrodes. The touch sensors are of a first touch sensing type, configured to detect proximity of the user's skin to the interface. The electrodes provide a plurality of electrical signals corresponding to the proximity of the user's skin to the interface.

23 Claims, 5 Drawing Sheets

(56) References Cited

U.S. PATENT DOCUMENTS

| | | | |
|---|---|---|---|
| 2013/0208431 A1* | 8/2013 | Shinoda | G06F 1/1626 361/736 |
| 2013/0285971 A1* | 10/2013 | Elias | G06F 3/044 345/174 |
| 2014/0320411 A1* | 10/2014 | Kuzmin | G06F 3/04886 345/168 |
| 2015/0077398 A1* | 3/2015 | Yairi | G06F 3/0416 345/175 |
| 2015/0248178 A1* | 9/2015 | Oh | G06F 3/0416 345/174 |
| 2016/0313194 A1* | 10/2016 | Scheffer | G06F 3/0414 |
| 2017/0300166 A1* | 10/2017 | Rosenberg | G06F 3/045 |
| 2017/0351364 A1* | 12/2017 | Kim | G06K 9/00 |
| 2018/0032211 A1* | 2/2018 | King | G06F 3/04186 |
| 2018/0188816 A1* | 7/2018 | Liu | G06F 3/011 |
| 2018/0196524 A1* | 7/2018 | Sellen | G06F 3/0488 |
| 2018/0275800 A1* | 9/2018 | Hu | G06F 3/0346 |
| 2018/0284947 A1* | 10/2018 | Khajeh | G06F 3/04142 |

* cited by examiner

FLEXIBLE TOUCH SENSING ASSEMBLY FOR DETECTING PROXIMITY OF USER TO A CONTROLLER DEVICE

BACKGROUND

This disclosure relates generally to a controller device for receiving user input, and specifically to a flexible touch sensing assembly for detecting proximity of a user to or force by a user on a controller device.

Controller devices in an artificial reality system often include input features for receiving user input. Some controller devices utilize capacitive sensing for detecting a proximity of a user's skin to the controller devices or for detecting a force applied by the user's skin on the controller devices. Conventional capacitive sensing typically comprise a nonconductive interface layer with one or more touch sensors that produce electrical signals corresponding to either a proximity of a user's skin to the nonconductive interface layer or a force applied by the user's skin on the nonconductive interface layer. However, the process of coupling a multitude of touch sensors onto surfaces of various contours can be a challenging endeavor. Additionally, conventional controller devices typically have organic shapes (e.g., non-planar) that demand sensors to be relatively small and/or flexible.

SUMMARY

A controller device comprises a touch sensing assembly configured to detect a proximity of a user's skin to the controller device, a force applied by the user's skin on the controller device, or a combination thereof. The controller device may be a component of an artificial reality system. The touch sensing assembly comprises one or more touch sensing layers, and at least one of the one or more touch sensing layers can be coupled to an interface. The interface may be, e.g., a nonconductive interface material has a first surface and a second surface that are opposite one another. In some embodiments, the interface may also include portions of the touch sensing assembly. The interface is configured to receive contact with skin of a user. In some embodiments, the interface may form a hand grip of a controller device.

A touch sensing layer comprises a plurality of touch sensors and a plurality of electrodes. The touch sensors detect one of a proximity of a user's skin to the interface and/or interaction region, a force applied by the user's skin to the interface and/or interaction region, and a combination thereof. In some embodiments, the touch sensors of one touch sensing layer are all of one type of touch sensing—i.e. proximity sensing or force sensing—or a combination of two types of touch sensing—i.e. proximity sensing and force sensing. Each touch sensor may be configured either as a capacitive touch sensor or a resistive touch sensor. The electrodes are coupled to the touch sensors and configured to provide a plurality of electrical signals corresponding to the touch sensing by the touch sensors. In additional embodiments, a controller is electrically coupled to the electrodes and configured to determine the proximity of the user's skin to the first surface of the nonconductive interface material, the force applied by the user's skin to the first surface of the nonconductive interface material, or a combination thereof based on the electrical signals received from the electrodes.

In some embodiments, the touch sensing layer further comprises a flexible material that allows for the touch sensing layer to conform to curved or planar surfaces. In one embodiment, the flexible material is also nonconductive. In an embodiment with one touch sensing layer, the touch sensors are coupled in between the flexible material and the interface.

Figure 1:
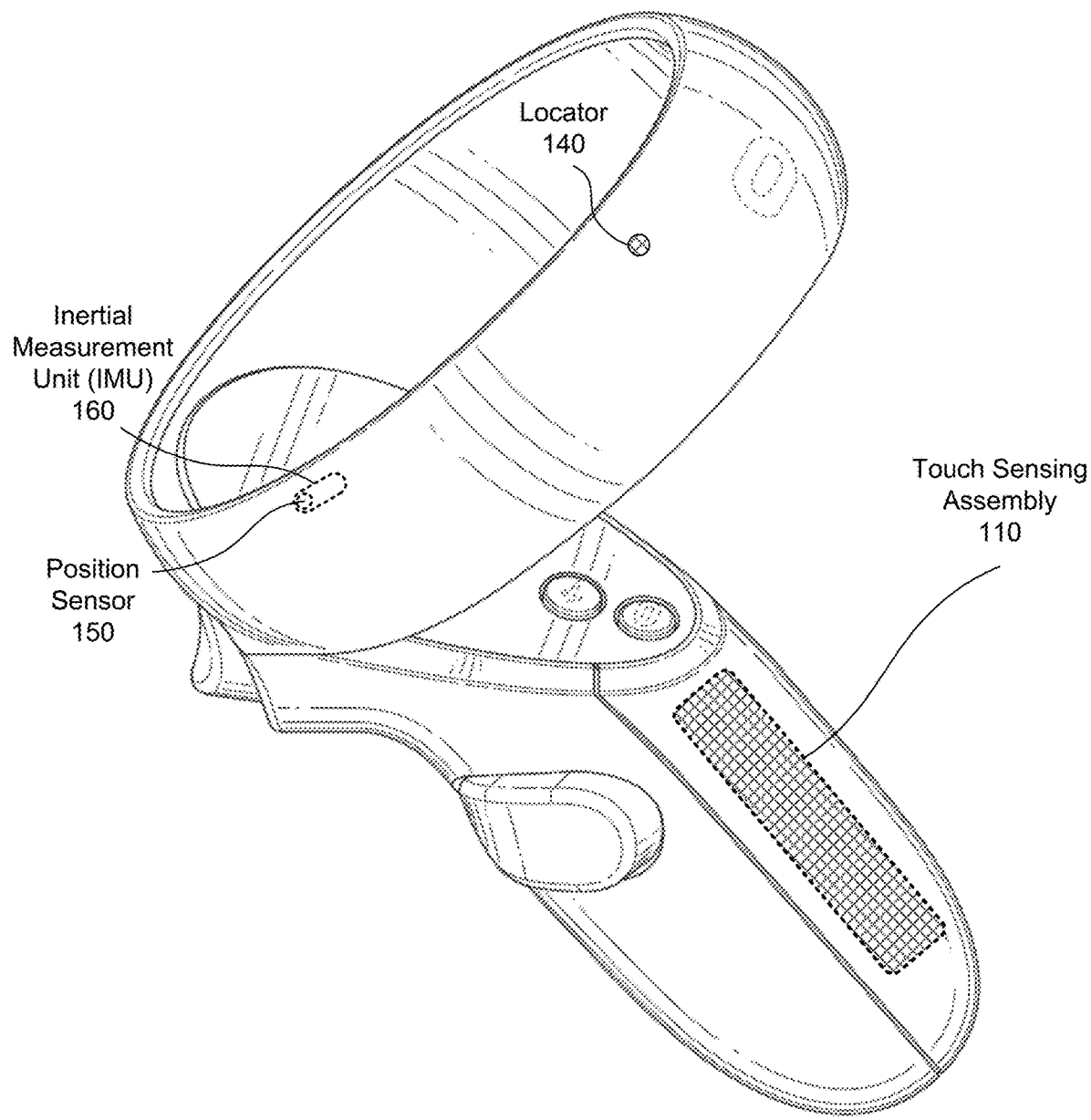
FIG. 1 is a perspective view of a hand controller, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an eyewear device, a head-mounted display (HMD) assembly with the eyewear device as a component, a HMD connected to a host computer system, a standalone HMD, a mobile device or computing system, or any other hardware platform capable of providing artificial reality content to one or more viewers. In addition, the artificial reality system may implement multiple controller devices for receiving user input which may influence the artificial reality content provided to the user.

System Architecture

A touch sensing assembly detects a proximity of a user's skin to a controller device, a force applied by the user's skin to the controller device, or a combination thereof. The touch sensing assembly may be a component of the controller device with the touch sensing assembly potentially being integrated into an exterior surface of the controller device.

The detected proximity of the user's skin may be described as a distance of the user's skin from the touch sensing assembly with some instances including contact of the touch sensing assembly. The touch sensing assembly comprises one or more touch sensing layers, and at least one of the one or more touch sensing layers can be coupled to an interface. The interface includes a surface that can be in direct contact with the user's skin. The interface is composed of a nonconductive interface material. In some embodiments, the interface may also include portions of the touch sensing assembly. The nonconductive interface material has a first surface and a second surface that are opposite one another. The first surface is configured to receive contact with skin of a user. In some embodiments, the nonconductive interface material forms a portion or an entirety of a hand grip of the controller device. One touch sensing layer comprises a plurality of touch sensors arranged in an array, and a plurality of electrodes electrically coupled to the touch sensors. The touch sensing layer may also include a flexible material. The flexible material allows for the touch sensing layer to conform to curved or planar surfaces. In one embodiment, the flexible material is also nonconductive. In an embodiment with one touch sensing layer, the touch sensors are coupled in between the flexible material and the second surface of the nonconductive interface material.

In another embodiment with more than one touch sensing layers, the touch sensing layers may be stacked atop one another such that the touch sensors of all but the first touch sensing layer are coupled to the flexible material of a preceding touch sensing layer. The touch sensors detect one of a proximity of a user's skin to the first surface of the nonconductive interface material, a force applied by the user's skin to the first surface of the nonconductive interface material, and a combination thereof.

In some embodiments, the touch sensors of one touch sensing layer are all of one type of touch sensing—i.e. proximity sensing or force sensing—or a combination of two types of touch sensing—i.e. proximity sensing and force sensing. Each touch sensor may be configured either as a capacitive touch sensor or a resistive touch sensor.

The electrodes are coupled to the touch sensors and configured to provide a plurality of electrical signals corresponding to the touch sensing by the touch sensors. In additional embodiments, a controller is electrically coupled to the electrodes and configured to determine the proximity of the user's skin to the first surface of the nonconductive interface material, the force applied by the user's skin to the first surface of the nonconductive interface material, or a combination thereof based on the electrical signals received from the electrodes.

FIG. 1 is a perspective view of a hand controller 100, in accordance with one or more embodiments. The hand controller 100 is an embodiment of a controller device containing one or more touch sensing assemblies 110. Note that the location of the touch sensing assembly 110 in a grip of the hand controller 100 in FIG. 1 is merely illustrative, and it may be located at other parts of the controller 100 (e.g., other surfaces, triggers, buttons, etc.). In one embodiment, the hand controller 100 comprises a single touch sensing assembly 110 that includes a plurality of touch sensing layers coupled to multiple portions of the hand controller 100. In another embodiment, the hand controller 100 comprises multiple touch sensing assemblies 110 with each touch sensing assembly having one or more touch sensing layers coupled to one portion of the hand controller 100 for touch sensing at that portion of the hand controller 100. The hand controller 100 additionally has one or more locators 140, a position sensor 150, and an inertial measurement unit (IMU) 160. In one embodiment, the hand controller 100 is a component of an artificial reality system. In other embodiments, the hand controller 100 contains additional components than those listed, e.g., the hand controller 100 has multiple touch sensing assemblies, multiple position sensors 150, or multiple IMUS 160. In the embodiment of FIG. 1, the hand controller 100 is configured to operate with one hand of the user; however, in other embodiments, a second hand controller with mirror symmetry in relation to the hand controller 100 may be configured to operate with the other hand of the user.

The touch sensing assembly 110 detects a proximity of the user's skin to the hand controller 100, a force applied by the user's skin to the hand controller 100, or a combination thereof. The touch sensing assembly 110 comprises one or more touch sensing layers, and at least one of which is coupled to a nonconductive interface material. The nonconductive interface material has a first surface and a second surface that are opposite one another. The first surface is configured to receive contact with skin of a user. The nonconductive interface material forms a portion or an entirety of a hand grip of the hand controller 100. One touch sensing layer comprises a flexible material, a plurality of touch sensors arranged in an array, and a plurality of electrodes electrically coupled to the touch sensors. The flexible material allows for the touch sensing layer to conform to curved or planar surfaces of the hand controller 100. In embodiments with more than one touch sensing layers, the touch sensing layers may be stacked atop one another. The touch sensors detect a proximity of a user's skin to the first surface of the nonconductive interface material, a force applied by the user's skin to the first surface of the nonconductive interface material, or a combination thereof. The electrodes are coupled to the touch sensors and configured to provide a plurality of electrical signals corresponding to the touch sensing by the touch sensors. In additional embodiments, a controller is electrically coupled to the electrodes and configured to determine the proximity of the user's skin to the first surface of the nonconductive interface material, the force applied by the user's skin to the first surface of the nonconductive interface material, or a combination thereof based on the electrical signals received from the electrodes. The touch sensing assembly will be further described in conjunction with FIGS. 2-4.

The one or more locators 140 are objects located in specific positions on the hand controller 100. In some embodiments, each locator 140 may be placed above or below an exterior surface of the hand controller 100. Each locator 140 may be a light emitting diode (LED), a corner cube reflector, a reflective marker, a type of light source that contrasts with an environment in which the hand controller 100 operates, or some combination thereof. In embodiments where the locators 140 are active (i.e., an LED or other type of light emitting device), the locators 140 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof. In embodiments where the locators 140 are passive, the locators 140 may reflect light in the visible band (~380 nm to 750 nm), in the infrared (IR) band (~750 nm to 1 mm), in the ultraviolet band (10 nm to 380 nm), some other portion of the electromagnetic spectrum, or some combination thereof. The locators 140 will be described in greater detail in conjunction with FIG. 5.

The position sensor 150 generates one or more measurement signals in response to motion of the hand controller 100. The position sensor 150 may be located external to the IMU 160, internal to the IMU 160, or some combination thereof. The position sensor 150 will be described in greater detail in conjunction with FIG. 5.

The IMU 160 is an electronic device that generates IMU data. Based the measurement signals from the position sensor 150, the IMU 160 generates IMU data indicating an estimated position of the hand controller 100 relative to an initial position of the hand controller 100. The IMU 160 will be described in greater detail in conjunction with FIG. 5.

Figure 2:
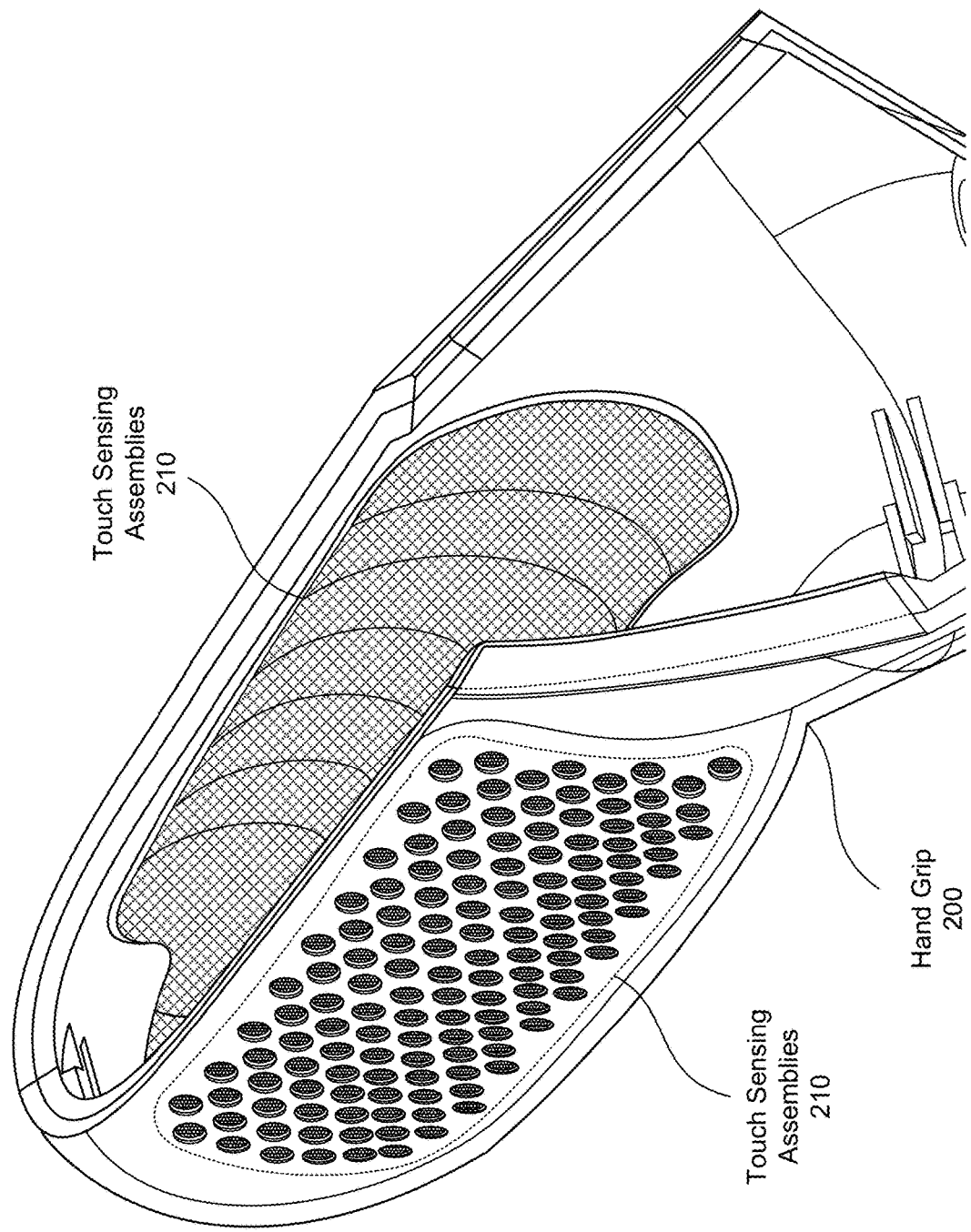
FIG. 2 is a cutaway view of a hand grip with touch sensing assemblies, in accordance with one or more embodiments.
Figure 3:
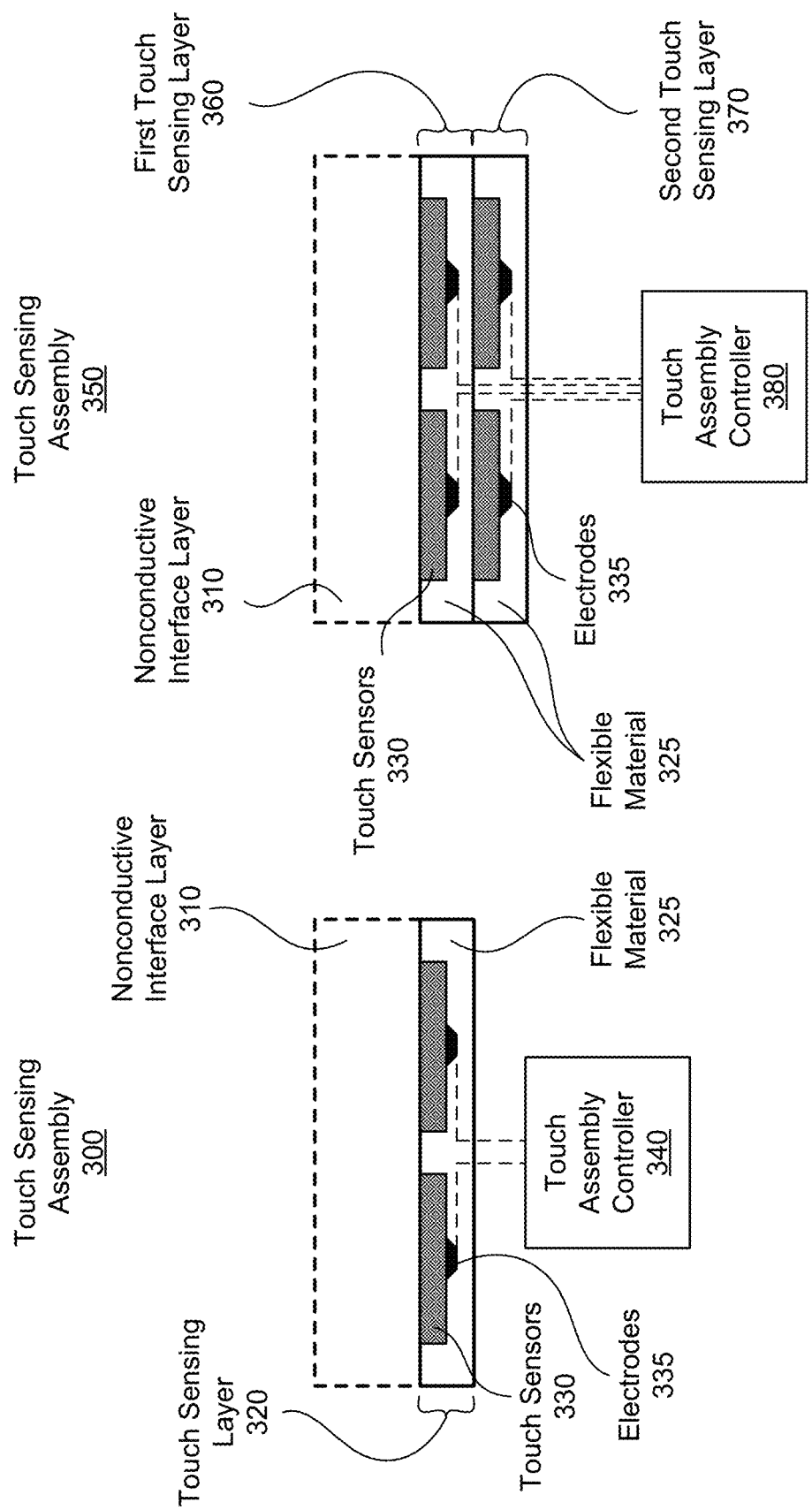
FIG. 3A is a cross sectional view of a touch sensing assembly with a single touch sensing layer, in accordance with one or more embodiments.
FIG. 3B is a cross sectional view of a touch sensing assembly with two touch sensing layers, in accordance with one or more embodiments.

FIG. 2 is a cutaway view of a hand grip 200 with touch sensing assemblies 210, in accordance with one or more embodiments. According to an embodiment, the hand grip 200 may be a component of the hand controller 100. In the embodiment of FIG. 2, the hand grip 200 has two touch sensing assemblies 210 coupled to opposite sides of the hand grip 200. In one embodiment, the touch sensing assemblies 210 are embodiments of the touch sensing assembly 110. The touch sensing assemblies 210 each comprise a touch sensing layer with an array of touch sensors incorporated in a flexible material. The touch sensing layers are flexible enabling the touch sensing layers to conform irregular surfaces, curved surfaces, planar surfaces, or some combination thereof. The hand grip 200 is curved so as to comfortably fit within a user's hand when held. In the embodiment of FIG. 2, the touch sensing assemblies 210 are able to conform to the curve of the hand grip 200 due to the touch sensing layers composed of the flexible material. In contrast, conventional capacitive sensing systems are not flexible or capable of being mounted on non-planar surfaces. Conventional systems generally utilize rigid, planar surfaces (e.g. smart phone screens) to mount the touch sensor.

FIG. 3A is a cross sectional view of a touch sensing assembly 300 with a single touch sensing layer 320, in accordance with one or more embodiments. The touch sensing assembly is coupled to a portion of a nonconductive interface layer 310 (e.g., may be part of an external surface of a controller device). The touch sensing assembly 300 includes the touch sensing layer 320 and a touch sensing assembly controller 340. The touch sensing layer 320 includes a flexible material 325, a plurality of touch sensors 330, and a plurality of electrodes 335. The plurality of touch sensors 330 are arranged in an array embedded within the flexible material 325. The electrodes 335 electrically couple the touch sensors 330 to the touch sensing assembly controller 340. The touch sensing assembly controller 340 determines a proximity of a user's skin to the nonconductive interface layer 310, a force applied by the user's skin to the nonconductive interface layer 310, or a combination thereof based on the touch sensors 330. The touch sensing assembly 300 may be an embodiment of the touch sensing assembly 110.

The nonconductive interface layer 310 provides an interface for receiving contact by a user of the touch sensing assembly 300. In this embodiment, the nonconductive interface layer 310 is an interface. In some embodiments (not shown), portions of the touch sensing layer 320 may also be part of the interface such that the user's skin may be in direct contact with the touch sensing layer 320. The nonconductive interface material 310 is composed of a nonconductive material. In some embodiments, the nonconductive material may be an inorganic material, an organic polymer, or some combination thereof. In alternative embodiments, the nonconductive interface layer 310 is composed of a semiconductive material rather than a nonconductive material; however, the nonconductive interface layer 310 has a smaller conductivity than that of the touch sensors 330. In some embodiments, the nonconductive interface layer 310 is rigid, flexible, or some combination thereof. For example, the first surface of the nonconductive interface layer 310 may flex when the user applies a force to the first surface, while the second surface of the nonconductive interface layer 310 is rigid. The nonconductive interface layer 310 includes a first surface and a second surface that is opposite the first surface. The first surface of the nonconductive interface layer 310 receives contact with a user's skin. The first surface of the nonconductive interface layer 310 may be curved so as to fit within a hand. The nonconductive interface layer 310 may have uniform or variable thickness. In embodiments with uniform thickness, the second surface of the nonconductive interface layer 310 would have a similar curvature to the first surface of the nonconductive interface layer 310.

The flexible material 325 provides the touch sensing layer 320 with flexibility to conform to any planar or curved surface. The flexible material 325 is composed of a flexible material. In some embodiments, the flexible material 325 is composed of a nonconductive material. Due to its flexibility, the flexible material 325 easily conforms to any planar or curved surface. The flexible material 325 holds the touch sensors 330 in place as well as the electrodes 335. In one embodiment, the flexible material 325 has the touch sensors 330 embedded such that the touch sensors 330 are flush with a surface of the flexible material 325. In some embodiments, the flexible material 325 forms around the electrodes 335. The flexible material could be, but not limited to, TPE (Thermoplastic Elastomer), TPU (Thermoplastic Urethane), polyurethane, polyester, or nylon. The material thickness and durometer may be range from, e.g., 0.1 mm to 1.5 mm and Shore A 40 to 90, respectively. Material type, thickness and durometer are all application dependent and can vary dramatically based on design goals.

The touch sensing layer 320 detects touch sensing of the nonconductive interface layer 310. The touch sensing layer 320 contains the flexible material 325, the touch sensors 330, and the electrodes 335. The touch sensing layer 320 may be of a uniform or non-uniform thickness. In some embodiments, the touch sensing layer 320 has the touch sensors 330 embedded into the flexible material 325 so as to have a uniform thickness. The touch sensors 330 may be arranged in an array on the flexible material 325, arrangements of which will be discussed in further detail in conjunction with FIG. 4. In embodiments where the touch sensing layer 320 is flush on a surface with the touch sensors 330, the touch sensing layer 320 conforms to the curvature of the second surface of the nonconductive interface layer 310. Due to the flexibility of the flexible material 325, the touch sensing layer 320 can conform to an irregular surface, a curved surface, a planar surface, or some combination thereof. The touch sensing layer 320 may vary in all dimensional factors such as shape, length, width, or any combination thereof. For example, a touch sensing layer 320 may be shaped to an appropriate shape and size so as to fit onto any shaped surface. The touch sensing layer 320 is coupled (e.g., via an adhesive, mechanically coupled, etc.) to the nonconductive interface layer 310.

The touch sensing layer 320 may be configured to operate as a proximity sensing layer, a force sensing layer, or a combination thereof. In embodiments where the touch sensing layer 320 is configured as a proximity sensing layer, the touch sensors 330 are all configured for proximity sensing. Similarly in embodiments with a force sensing layer, all the touch sensors 330 are configured for force sensing. In some embodiments, the touch sensing layer 320 is configured for both proximity sensing and force sensing. In these embodiments, the touch sensing layer 320 comprises touch sensors 330 that include one or more touch sensors 330 that are configured for proximity sensing and one or more touch sensors 330 that are configured for force sensing. In one embodiment, the proximity sensing touch sensors and the force sensing touch sensors are interleaved in the touch sensing layer 320.

The touch sensors 330 sense touch by a user of the touch sensing assembly 300. The touch sensors 330 detect either a proximity of a user's skin to the first surface of the nonconductive interface layer 310, a force applied by the user's skin to the first surface of the nonconductive interface layer 310, or a combination thereof. Each touch sensor of the touch sensors 330 may be a capacitive touch sensor or a resistive touch sensor. A capacitive touch sensor utilizes a conductive layer to detect a change in a surface capacitance of the nonconductive interface layer 310 when the user's skin approaches or comes in contact with the nonconductive interface layer 310. In some embodiments, the capacitive touch sensor is composed of a conductive plastic as the conductive layer for detecting changes in the surface capacitance of the nonconductive interface layer 310. Additionally, the capacitive touch sensor may detect either a proximity of the user's skin to the nonconductive interface layer or a force applied by the user's skin to the nonconductive interface layer. A resistive touch sensor utilizes a variably conductive layer that varies in conductivity when the user's skin approaches or comes in contact with the nonconductive interface layer 310. The resistive touch sensor may also detect either a proximity of the user's skin to the nonconductive interface layer or a force applied by the user's skin to the nonconductive interface layer. In some embodiments, the resistive touch sensor has a greater force sensing range than the capacitive touch sensor. In other embodiments, the capacitive touch sensors has a greater proximity sensing range than the capacitive touch sensor. Each touch sensor of the touch sensors 330 may be configured to operate as a proximity sensing touch sensor, a force sensing touch sensor, or a combination thereof. For proximity sensing, the touch sensors 330 determine a distance of the user's skin to the first surface of the nonconductive interface layer 310. For force sensing, the touch sensors 330 determine a force applied by the user's skin on the first surface of the nonconductive interface layer 310.

The touch sensors 330 are sensitive over a range of force magnitudes. Accordingly, they may detect applied forces that have a magnitude with the range of force magnitudes.

In some embodiments, the touch sensors 330 have include a first set configured for proximity sensing and a second set configured for force sensing. The set for force sensing and/or the set for proximity sensing may have an active state (i.e., actively monitoring for proximity or force) and an inactive state (i.e., are not monitoring for proximity or force). In some embodiments, responsive to a determination that the user's skin is within a threshold distance, the touch assembly controller 340 causes the set of force sensors to be in the active state. Likewise, responsive to a determination that the user's skin is at least the threshold distance (i.e., greater than or equal to the threshold distance), the touch assembly controller 340 causes the set of force sensors to be in the inactive state.

The electrodes 335 transmit electrical signals corresponding to touch sensing by the touch sensor 330. The electrodes 335 are electrically coupled to the touch sensors 330. The electrodes 335 are composed of a conductive material. The electrodes 335 may additionally be covered in an insulating material (e.g., the flexible material 325 composed of an insulating material). In some embodiments, each touch sensor 330 has an electrode 335 coupled to that touch sensor 330. In other embodiments, one or more electrodes 335 may be coupled to each touch sensor 330.

The touch sensing assembly controller 340 determines a proximity of the user's skin to the nonconductive interface layer 310, a force applied by the user's skin to the nonconductive interface layer 310, or a combination thereof. The touch sensing assembly controller 340 is coupled to the electrodes 335 and receives the electrical signals from the touch sensors 330 via the electrodes 335. In the illustration of FIG. 3A, the touch sensing assembly controller 340 is represented by a box with the dashed lines representing electrical connections between the touch sensing assembly controller 340 and the electrodes 335. In some embodiments, the touch sensing assembly controller 340 is proximally located to the touch sensing layer 320. For example, the touch sensing assembly 300 may be configured as a hand grip of a hand controller (e.g. the hand grip 200) and the touch sensing assembly controller 340 is housed within the hand grip 200. In other embodiments, the touch sensing assembly controller 340 is located on an external device and is wirelessly coupled to the touch sensing layer 320. The touch sensing assembly controller 340 determines a proximity of the user's skin to the nonconductive interface layer 310, a force applied by the user's skin on the nonconductive interface layer 310, or a combination thereof based on the electrical signals received from the electrodes 335. In some embodiments, the touch sensing assembly controller 340 may further determine a proximity map describing a proximity of the user's skin above each position of the touch sensing layer 320. In other embodiments, the touch sensing assembly controller 340 may further determine a force map describing a force applied by the user's skin above each position of the touch sensing layer 320. In further embodiments, the touch sensing assembly controller 340 may determine a hybrid proximity-force map that describes either a proximity of the user's skin from the nonconductive interface layer 310 or a force applied by the user's skin on the nonconductive interface layer 310 at each position of the touch sensing layer 320.

FIG. 3B is a cross sectional view of a touch sensing assembly 350 with two touch sensing layers, in accordance with one or more embodiments. The touch sensing assembly 350 includes a first touch sensing layer 360 that is coupled to the nonconductive interface layer 310, a second touch sensing layer 370, and a touch sensing assembly controller 380. Both the first touch sensing layer 360 and the second touch sensing layer 370 are embodiments of the touch sensing layer 320 and include a flexible material 325, a plurality of touch sensors 330, and a plurality of electrodes 335. The plurality of touch sensors 330 of each touch sensing layer are arranged in an array embedded within the flexible material 325 of that touch sensing layer. The electrodes 335 electrically couple the touch sensors 330 to the touch sensing assembly controller 380. The touch sensing assembly controller 380 determines a proximity of a user's skin to the nonconductive interface layer 310, a force applied by the user's skin to the nonconductive interface layer 310, or a combination thereof based on the touch sensors 330. The touch sensing assembly 350 may be an embodiment of the touch sensing assembly 110.

The first touch sensing layer 360 and the second touch sensing layer 370 are stacked together to detect both a proximity of the user's skin to the nonconductive interface layer 310 and a force applied by the user's skin to the nonconductive interface layer 310. The first touch sensing layer 360 and the second touch sensing layer 370 may be identical in shape and size. Similarly the arrangement of the touch sensors 330 on the first touch sensing layer 360 and the second touch sensing layer 370 may be identical. In other embodiments, the touch sensors 330 of the first touch sensing layer 360 may be offset so as to be above interstices of the touch sensors 330 of the second touch sensing layer 370. In the illustration of FIG. 3B, the touch sensors of the first touch sensing layer 360 align with the touch sensors of the second touch sensing layer 370. One of the first touch sensing layer 360 and the second touch sensing layer 370 is configured to operate as proximity sensing with proximity sensing touch sensors 330 while the other is configured to operate as force sensing with force sensing touch sensors 330.

In this embodiment, the nonconductive interface layer 310 is an interface. In some embodiments (not shown), portions of the first touch sensing layer 360 and/or the second touch sensing layer 370 may also be part of the interface such that the user's skin may be in direct contact with the first touch sensing layer 360 and/or the second touch sensing layer 370.

The touch sensing assembly controller 380 determines a proximity of the user's skin to the nonconductive interface layer 310 and a force applied by the user's skin to the nonconductive interface layer 310. The touch sensing assembly controller 380 is coupled to the both the first touch sensing layer 360 and the second touch sensing layer 370 via the electrodes 335. The touch sensing assembly controller 380 receives the electrical signals the first touch sensors 330 via the electrodes 335 from the first touch sensing layer 360 and the second touch sensing layer 370. In the illustration of FIG. 3B, the touch sensing assembly controller 380 is represented by a box with the dashed lines representing electrical connections between the touch sensing assembly controller 380 and the electrodes 335. In some embodiments, the touch sensing assembly controller 380 is proximally located to the first touch sensing layer 360 and the second touch sensing layer 370. For example, the touch sensing assembly 350 may be configured as a hand grip of a hand controller (e.g. the hand grip 200) and the touch sensing assembly controller 380 is housed within the hand grip 200. In other embodiments, the touch sensing assembly controller 380 is located on an external device and is wirelessly coupled to the two touch sensing layers. The touch sensing assembly controller 380 determines a proximity of the user's skin to the nonconductive interface layer 310 and a force applied by user's skin on the nonconductive interface layer 310 based on the electrical signals received from the electrodes 335. In some embodiments, the touch sensing assembly controller 380 may further determine a proximity map describing a proximity of the user's skin above each position of the two touch sensing layers. In other embodiments, the touch sensing assembly controller 380 may further determine a force map describing a force applied by the user's skin above each position of the two touch sensing layers. In further embodiments, the touch sensing assembly controller 380 may determine a hybrid proximity-force map that describes either a proximity of the user's skin from the nonconductive interface layer 310 or a force applied by the user's skin on the nonconductive interface layer 310 above each position of the two touch sensing layers.

Figure 4:
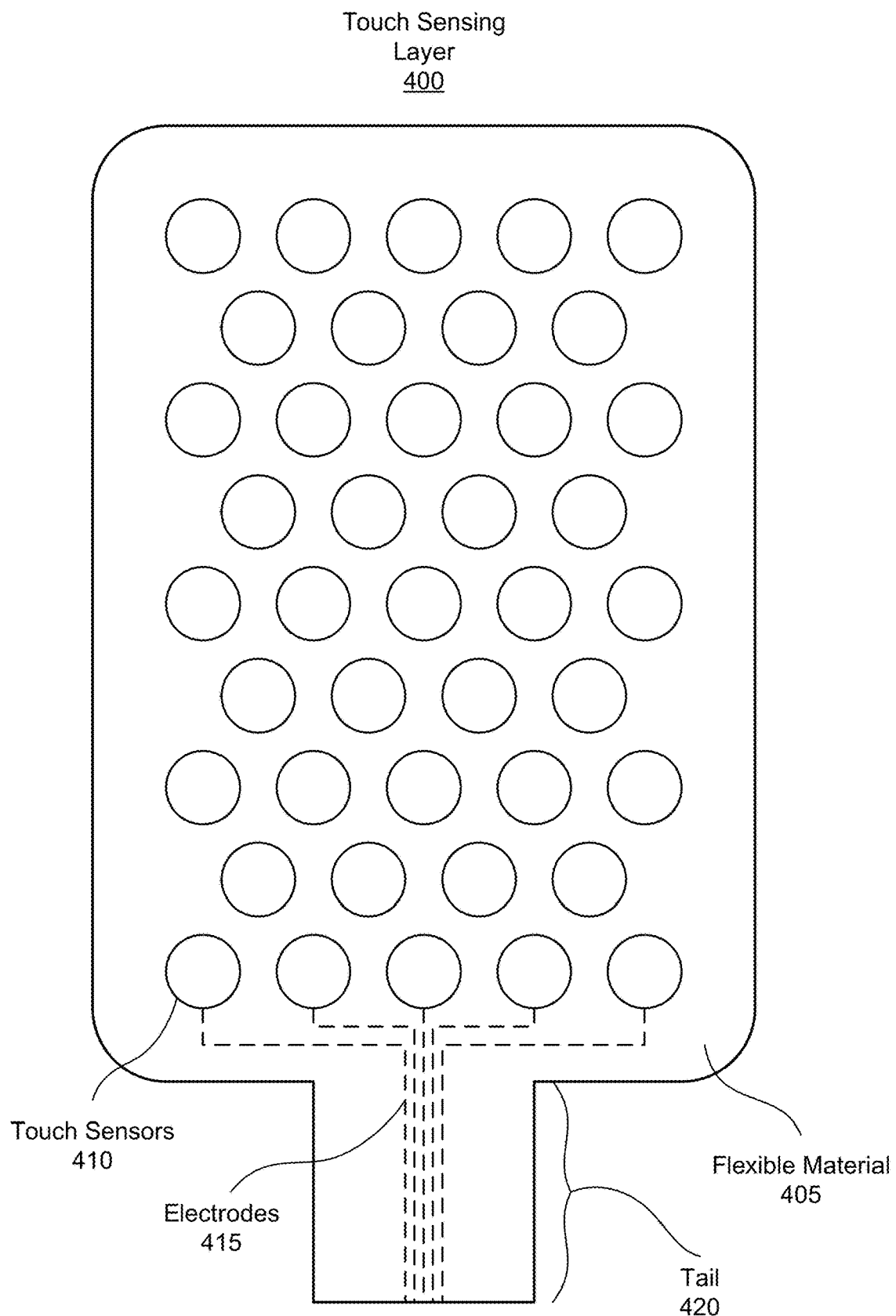
FIG. 4 is a plan view of a touch sensing layer, in accordance with one or more embodiments.

FIG. 4 is a plan view of a touch sensing layer 400, in accordance with one or more embodiments. The touch sensing layer 400 may be an embodiment of the touch sensing layer 320, the touch sensing layer 360, the touch sensing layer 370, or some combination thereof. The touch sensing layer 400 contains a flexible material 405, a plurality of touch sensors 410, a plurality of electrodes 415, and a tail 420. The flexible material 405, the touch sensors 410, and the electrodes 415 are embodiments of the flexible material 325, the touch sensors 330, and the electrodes 335, respectively. The tail 420 consolidates all the electrodes 415 and is connected to a touch sensing controller (not shown in this illustration).

The touch sensors 415 are arranged in an array on the touch sensing layer 400. The arrangements of the touch sensors 415 may vary from embodiment to embodiment. In one embodiment, the touch sensors 415 are circular shaped. In embodiments with circular shaped touch sensor 415, the touch sensors 415 may be arranged in a square packing or a hexagonal packing arrangement. In the illustration of FIG. 4, the touch sensors 415 are arranged in a spaced out hexagonal packing arrangement. In other embodiments, the touch sensors 415 may be arranged in a close packed hexagonal packing arrangement increasing a touch sensor arrangement density—i.e. a number of touch sensors 415 per unit of area. The touch sensor arrangement density affects a resolution of the proximity map, the force map, or the hybrid proximity-force map that can be generated with the touch sensors 415. A higher arrangement density can provide an improvement in resolution compared to a lower arrangement density.

In some embodiments, the touch sensors 410 are arranged such that there are one or more touch sensors that are specific for one or more digits of a hand of the user. And in some cases, for each digit of the hand of the user. For example, the touch sensors 410 may include touch sensors for each finger and thumb. And the provided touch sensors may be configured to determine proximity of the digit to the touch sensors and/or force applied by the digit to the touch sensors.

Figure 5:
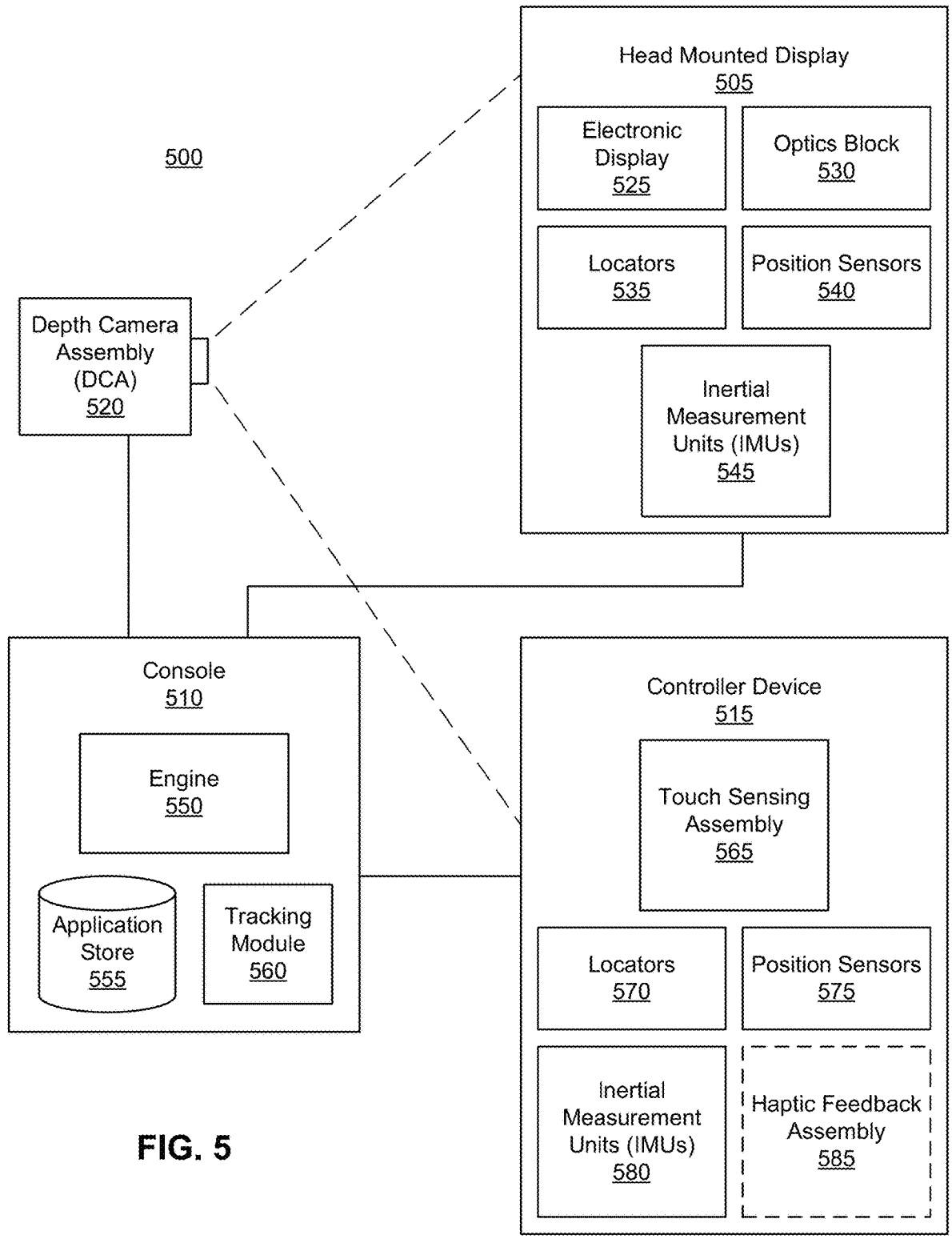
FIG. 5 is a system environment of a controller device in an artificial reality system, in accordance with one or more embodiments.

FIG. 5 is a system environment of a controller device 515 in an artificial reality system 500, in accordance with one or more embodiments. The artificial reality system 500 may operate in an artificial reality environment, e.g., a virtual reality, an augmented reality, a mixed reality environment, or some combination thereof. The artificial reality system 500 shown by FIG. 5 comprises a head-mounted display (HMD) 505, a controller device 515, and a depth camera assembly (DCA) 520 that is coupled to a console 510. While FIG. 5 shows an example artificial reality system 500 including one HMD 505 and one controller device 515, in other embodiments, any number of these components may be included in the artificial reality system 500. For example, there may be multiple HMD 505 each having an associated controller device 515 with each HMD 505 and controller device 515 communicating with the console 510. In alternative configurations, different and/or additional components may be included in the artificial reality system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 may be a HMD that presents content to a user comprising augmented views of a physical, real-world environment with computer-generated elements (e.g., two dimensional (2D) or three dimensional (3D) images, 2D or 3D video, sound, etc.). In some embodiments, the HMD 505 presents virtual content to the user that is based in part on a real environment surrounding the user. For example, virtual content may be presented to a user of the HMD 505. The user physically may be in a room, and virtual walls and a virtual floor of the room are rendered as part of the virtual content.

The HMD 505 may include an electronic display 525, an optics block 530, one or more locators 535, one or more position sensors 540, and one or more inertial measurement units (IMUs) 545. Some embodiments of the HMD 505 have different components than those described in conjunction with FIG. 5. Additionally, the functionality provided by various components described in conjunction with FIG. 5 may be differently distributed among the components of the HMD 505 in other embodiments, or be captured in separate assemblies remote from the HMD 505.

The electronic display 525 displays 2D or 3D images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an active-matrix organic light-emitting diode display (AMO-LED), some other display, or some combination thereof.

The optics block 530 magnifies image light received from the electronic display 525, corrects optical errors associated with the image light, and presents the corrected image light to a user of the HMD 505. In various embodiments, the optics block 530 includes one or more optical elements. Example optical elements included in the optics block 530 include: a waveguide, an aperture, a Fresnel lens, a convex lens, a concave lens, a filter, a reflecting surface, or any other suitable optical element that affects image light. Moreover, the optics block 530 may include combinations of different optical elements. In some embodiments, one or more of the optical elements in the optics block 530 may have one or more coatings, such as partially reflective or anti-reflective coatings.

The locators 535 are objects located in specific positions on the HMD 505 relative to one another. A locator 535 may be a light emitting diode (LED), a corner cube reflector, a reflective marker, a type of light source that contrasts with an environment in which the HMD 505 operates, or some combination thereof. In embodiments where the locators 535 are active (i.e., an LED or other type of light emitting device), the locators 535 may emit light in the visible band (~380 nm to 750 nm), in the infrared (IR) band (~750 nm to 1 mm), in the ultraviolet (UV) band (10 nm to 380 nm), some other portion of the electromagnetic spectrum, or some combination thereof. In other embodiments, the locators 535 include passive elements (e.g., a retroreflector). In these embodiments, the locators 535 may reflect over various bands of lights or over a specific band of light (e.g., visible band, IR band, UV band, etc.).

The IMUs 545 are electronic devices that generate data indicating a position of the HMD 505 based on measurement signals received from one or more of the position sensors 540. A position sensor 540 generates one or more measurement signals in response to motion of the HMD 505. Examples of position sensors 540 include: one or more accelerometers, one or more gyroscopes, one or more magnetometers, another suitable type of sensor that detects motion, a type of sensor used for error correction of the IMUs 545, or some combination thereof. The position sensors 540 may be located external to the IMUs 545, internal to the IMUs 545, or some combination thereof.

Based on the one or more measurement signals from one or more position sensors 540, the IMUs 545 generate data indicating an estimated current position of the HMD 505 relative to an initial position of the HMD 505. For example, the position sensors 540 include multiple accelerometers to measure translational motion (forward/back, up/down, left/right) and multiple gyroscopes to measure rotational motion (e.g., pitch, yaw, and roll). In some embodiments, the IMUs 545 rapidly sample the measurement signals and calculates the estimated current position of the HMD 505 from the sampled data. For example, the IMUs 545 integrate the measurement signals received from the accelerometers over time to estimate a velocity vector and integrate the velocity vector over time to determine an estimated current position of a reference point on the HMD 505. Alternatively, the IMUs 545 provide the sampled measurement signals to the console 510, which interprets the data to reduce error. The reference point is a point that may be used to describe the position of the HMD 505. The reference point may generally be defined as a point in space or a position related to the HMD's 505 orientation and position.

The controller device 515 is a device that allows a user to send action requests and receive responses from the console 510. An action request is a request to perform a particular action. For example, an action request may be an instruction to start or end capture of image or video data, or an instruction to perform a particular action within an application. In some embodiments, the controller device 515 comprises one or more touch sensing assemblies 565, one or more locators 570, one or more position sensors 575, and one or more IMUs 580. The hand controller 100 is one embodiment of the controller device 515.

The touch sensing assembly 565 detects a proximity of the user's skin to the controller device 515, a force applied by the user's skin to the controller device 515, or a combination thereof. The touch sensing assembly 565 comprises a nonconductive interface layer, one or more touch sensing layers, and a touch sensing assembly controller. The nonconductive interface layer is configured to receive contact with the user's skin. In some embodiments, the nonconductive interface layer is formed to be an exterior portion of the controller device 515. The nonconductive interface layer is primarily composed of a nonconductive material. The nonconductive interface layer may be curved in at least one dimension, irregular, planar, or some combination thereof. The touch sensing layer contains a flexible material, a plurality of touch sensors, and a plurality of electrodes. The touch sensors are arranged in an array on the flexible material. The flexible material provides flexibility to the touch sensing layer enabling the touch sensing layer to conform to curved or planar surfaces of the nonconductive interface layer. The touch sensors on the one or more touch sensing layers may be configured to detect a proximity of the user's skin to the nonconductive interface layer, a force applied by the user's skin to the nonconductive interface layer, or a combination thereof. The electrodes transmit electrical signals from the touch sensors to the touch sensing assembly controller. The touch sensing assembly controller may then determine the proximity of the user's skin to the nonconductive interface layer, a force applied by the user's skin to the nonconductive interface layer, or a combination thereof. In some embodiments, the touch sensing assembly 110, the touch sensing assembly 300, and the touch sensing assembly 350 are all embodiments of the touch sensing assembly 565.

The proximity of the user's skin to the touch sensing assembly 565, the force applied by the user's skin to the touch sensing assembly 565, or some combination thereof may comprise the action request communicated to the console 510. The one or more action requests received by the controller device 515 is communicated to the console 510, which performs one or more actions corresponding to the action requests. The locators 570, the position sensors 575, and the IMUS 580 are embodiments of the locators 535, the position sensors 540, and the IMUS 545.

In some embodiments, the controller device 515 further comprises a haptic feedback assembly 585 for providing haptic feedback to the user of the artificial reality system 500. In some embodiments, the haptic feedback assembly 585 may provide haptic feedback to the user in accordance with instructions received from the console 510. For example, haptic feedback is provided when an action request is received, or the console 510 communicates instructions to the controller device 515 causing the controller device 515 to generate haptic feedback when the console 510 performs an action.

The depth camera assembly (DCA) 520 captures data describing depth information of a local area surrounding some or all of the HMD 505 and the controller device 515. In one embodiment, the DCA 520 includes a light generator, an imaging device, and a DCA controller that may be coupled to both the light generator and the imaging device. The light generator illuminates a local area with illumination light, e.g., in accordance with emission instructions generated by the DCA controller. The DCA controller is configured to control, based on the emission instructions, operation of certain components of the light generator, e.g., to adjust an intensity and a pattern of the illumination light illuminating the local area. In some embodiments, the illumination light may include a structured light pattern, e.g., dot pattern, line pattern, etc. The imaging device captures one or more images of one or more objects in the local area illuminated with the illumination light. In another embodiment, the DCA 520 includes an imaging device to capture positions of the locators 535 associated with the HMD 505 and the locators 570 of the controller device 515. The imaging device is configured to detect light emitted or reflected from locators 535 and 570 in a field of view of the imaging device. In embodiments where the locators 535 and 570 include passive elements (e.g., a retroreflector), the DCA 520 includes a light source that illuminates some or all of the locators 535 and 570, which retro-reflect the light towards the light source in the imaging device. The DCA 520 can compute the depth information using the data captured by the imaging device or the DCA 520 can send this information to another device such as the console 510 that can determine the depth information using the data from the DCA 520. In additional embodiments, the DCA 520 may be integrated as part of the HMD 505 capturing depth information of the controller device 515 or other components in relation to a position of the HMD 505.

The console 510 provides content to the HMD 505 for processing in accordance with information received from one or more of: the HMD 505 and the controller device 515. In the example shown in FIG. 5, the console 510 includes an application store 555, a tracking module 560 and an engine 550. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the controller device 515. Examples of applications include: gaming applications, conferencing applications, video playback applications, or other suitable applications.

The tracking module 560 calibrates the system environment 500 using one or more calibration parameters and may adjust one or more calibration parameters to reduce error in determination of the position of the HMD 505 or of the controller device 515. Calibration performed by the tracking module 560 also accounts for information received from the IMUs 545 in the HMD 505 and/or IMUs 545 included in the controller device 515. Additionally, if tracking of the HMD 505 is lost, the tracking module 560 may re-calibrate some or all of the system environment 500.

The tracking module 560 tracks movements of the HMD 505, the controller device 515, or some combination thereof using information from the one or more position sensors 540, the IMUs 545, the DCA 520, or some combination thereof. For example, the tracking module 560 determines a position of a reference point of the HMD 505 in a mapping of a local area based on information from the HMD 505. The tracking module 560 may also determine positions of the reference point of the HMD 505 using data indicating a position of the HMD 505 from the IMUs 545. The tracking module 560 may determine positions of or a reference point of the controller device 515 using data indicating a position of the controller device 515 from IMUs 545 included in the controller device 515. Additionally, in some embodiments, the tracking module 560 may use portions of data indicating a position of the HMD 505 from the IMUs 545 to predict a future location of the HMD 505. The tracking module 560 provides the estimated or predicted future position of the HMD 505, the controller device 515, or both to the engine 550.

The engine 550 also executes applications within the system environment 500 and receives position information, acceleration information, velocity information, predicted future positions, or some combination thereof, of the HMD 505 from the tracking module 560. Based on the received information, the engine 550 determines content to provide to the HMD 505 for presentation to the user. For example, if the received information indicates that the user has looked to the left, the engine 550 generates content for the HMD 505 that mirrors the user's movement in a virtual environment or in an environment augmenting the local area with additional content. Additionally, the engine 550 performs an action within an application executing on the console 510 in response to an action request received from the controller device 515 and provides feedback to the user that the action was performed. The provided feedback may be visual or audible feedback via the HMD 505 or haptic feedback via the controller device 515.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A touch sensing assembly comprising:
a first touch sensing layer that is composed of a flexible material such that the first touch sensing layer conforms to a curved surface of an interface, the interface configured to receive contact with skin of a user, the first touch sensing layer comprising:
a first plurality of touch sensors of a first touch sensing type, the first plurality of touch sensors arranged in an array embedded in the flexible material and flush with a surface of the first touch sensing layer such that the surface and the first plurality of touch sensors conform to the curved surface of the interface, and the first plurality of touch sensors is configured to detect proximity of the skin of the user to the interface, and
a first plurality of electrodes electrically coupled to the first plurality of touch sensors and the first plurality of electrodes is configured to provide a first plurality of electrical signals, wherein the first plurality of electrical signals correspond to a proximity of the skin of the user to the interface.

2. The touch sensing assembly of claim 1, wherein the interface is at least partially composed of a nonconductive material comprising a first surface and a second surface that is opposite the first surface, the touch sensing assembly further comprising:
a controller electrically coupled to the first touch sensing layer and configured to determine a proximity of the skin of the user to the first surface of the nonconductive interface material based on the first plurality of electrical signals.

3. The touch sensing assembly of claim 2, wherein the determined proximity of the skin of the user includes a first proximity and a second proximity, the first proximity corresponding to a first distance between a first portion of the skin and a first location on the nonconductive interface material and the second proximity corresponding to a second distance between a second portion of the skin and a second location on the nonconductive interface material.

4. The touch sensing assembly of claim 2, wherein the first touch sensing layer further comprises:
a second plurality of touch sensors of a second touch sensing type arranged in the array including the first plurality of touch sensors, and the second plurality of touch sensors are configured to detect force applied by the skin of the user to the first surface of the nonconductive interface material, and
a second plurality of electrodes electrically coupled to the second plurality of touch sensors and configured to provide a second plurality of electrical signals, wherein the second plurality of electrical signals correspond to a force applied by the skin of the user to the first surface of the nonconductive interface material.

5. The touch sensing assembly of claim 4, wherein the second plurality of touch sensors are sensitive over a range of force magnitudes, and a force is detected by the second plurality of touch sensors that has a magnitude within the range of force magnitudes.

6. The touch sensing assembly of claim 4, wherein at least some of the second plurality of touch sensors are positioned such that for multiple digits of a hand of the user there is at least one touch sensor configured to detect a force applied each of the respective multiple digits.

7. The touch sensing assembly of claim 4, wherein the second plurality of touch sensors have an active state and an inactive state, and the controller is further configured to:
cause the second plurality of touch sensors to be in the active state responsive to the determined proximity being within a threshold distance.

8. The touch sensing assembly of claim 4, wherein the second plurality of touch sensors have an active state and an inactive state, and the controller is further configured to:
cause the second plurality of touch sensors to be in the inactive state responsive to the determined proximity being at least a threshold distance.

9. The touch sensing assembly of claim 2, wherein the determined proximity of the skin of the user is a contact of the skin of the user to the interface.

10. The touch sensing assembly of claim 1, wherein each touch sensor is circular and wherein the array is arranged in hexagonal packing.

11. The touch sensing assembly of claim 1, wherein each touch sensor of the first plurality of touch sensors is a capacitive sensor that measures a surface capacitance of the interface.

12. The touch sensing assembly of claim 1, wherein each touch sensor of the first plurality of touch sensors is a resistive sensor that measures a resistance of the resistive sensor.

13. The touch sensing assembly of claim 1, wherein the nonconductive interface material forms a hand grip on a hand held controller device.

14. The touch sensing assembly of claim 1, wherein at least some of the first plurality of touch sensors are positioned such that for each digit of a hand of the user there is at least one touch sensor configured to detect proximity to the respective digit.

15. A hand-held controller device comprising:
a touch sensing assembly coupled to an interface material to form an interface, and the interface is configured to receive contact with skin of a user, the touch sensing assembly comprising:
a first touch sensing layer that is composed of a flexible material such that the first touch sensing layer conforms to a curved surface of the interface, the first touch sensing layer comprising:
a first plurality of touch sensors of a first touch sensing type, the first plurality of touch sensors arranged in an array embedded in the flexible material and flush with a surface of the first touch sensing layer such that the surface and the first plurality of touch sensors conform to the curved surface of the interface, and the first plurality of touch sensors is configured to detect proximity of the skin of the user to the interface, and
a first plurality of electrodes electrically coupled to the first plurality of touch sensors and the first plurality of electrodes is configured to provide a first plurality of electrical signals, wherein the first plurality of electrical signals correspond to a proximity of the skin of the user to the interface.

16. The controller device of claim 15, wherein the interface is part of a region of the controller device selected from a group consisting of: a trigger of the controller device, a button of a controller device, and a grip of the controller device.

17. The controller device of claim 15, wherein the interface forms a hand grip on the controller device.

18. The controller device of claim 15, wherein the interface is at least partially composed of a nonconductive material comprising a first surface and a second surface that is opposite the first surface, the touch sensing assembly further comprising:
a controller electrically coupled to the first touch sensing layer and configured to determine a proximity of the skin of the user to the first surface of the nonconductive interface material based on the first plurality of electrical signals.

19. The controller device of claim 18, wherein the determined proximity of the skin of the user includes a first proximity and a second proximity, the first proximity corresponding to a first distance between a first portion of the skin and a first location on the nonconductive interface material and the second proximity corresponding to a second distance between a second portion of the skin and a second location on the nonconductive interface material.

20. The controller device of claim 18, wherein the first touch sensing layer further comprises:
a second plurality of touch sensors of a second touch sensing type arranged in the array including the first plurality of touch sensors, and the second plurality of touch sensors are configured to detect force applied by the skin of the user to the first surface of the nonconductive interface material, and
a second plurality of electrodes electrically coupled to the second plurality of touch sensors and configured to provide a second plurality of electrical signals, wherein the second plurality of electrical signals correspond to a force applied by the skin of the user to the first surface of the nonconductive interface material.

21. The controller device of claim 20, wherein the second plurality of touch sensors are sensitive over a range of force magnitudes, and a force is detected by the second plurality of touch sensors that has a magnitude within the range of force magnitudes.

22. The controller device of claim 20, wherein at least some of the second plurality of touch sensors are positioned such that for multiple digits of a hand of the user there is at least one touch sensor configured to detect a force applied each of the respective multiple digits.

23. The controller device of claim 20, wherein the second plurality of touch sensors have an active state and an inactive state, and the controller is further configured to:
cause the second plurality of touch sensors to be in the active state responsive to the determined proximity being within a threshold distance; and
cause the second plurality of touch sensors to be in the inactive state responsive to the determined proximity being at least the threshold distance.

* * * * *